UNITED STATES PATENT OFFICE.

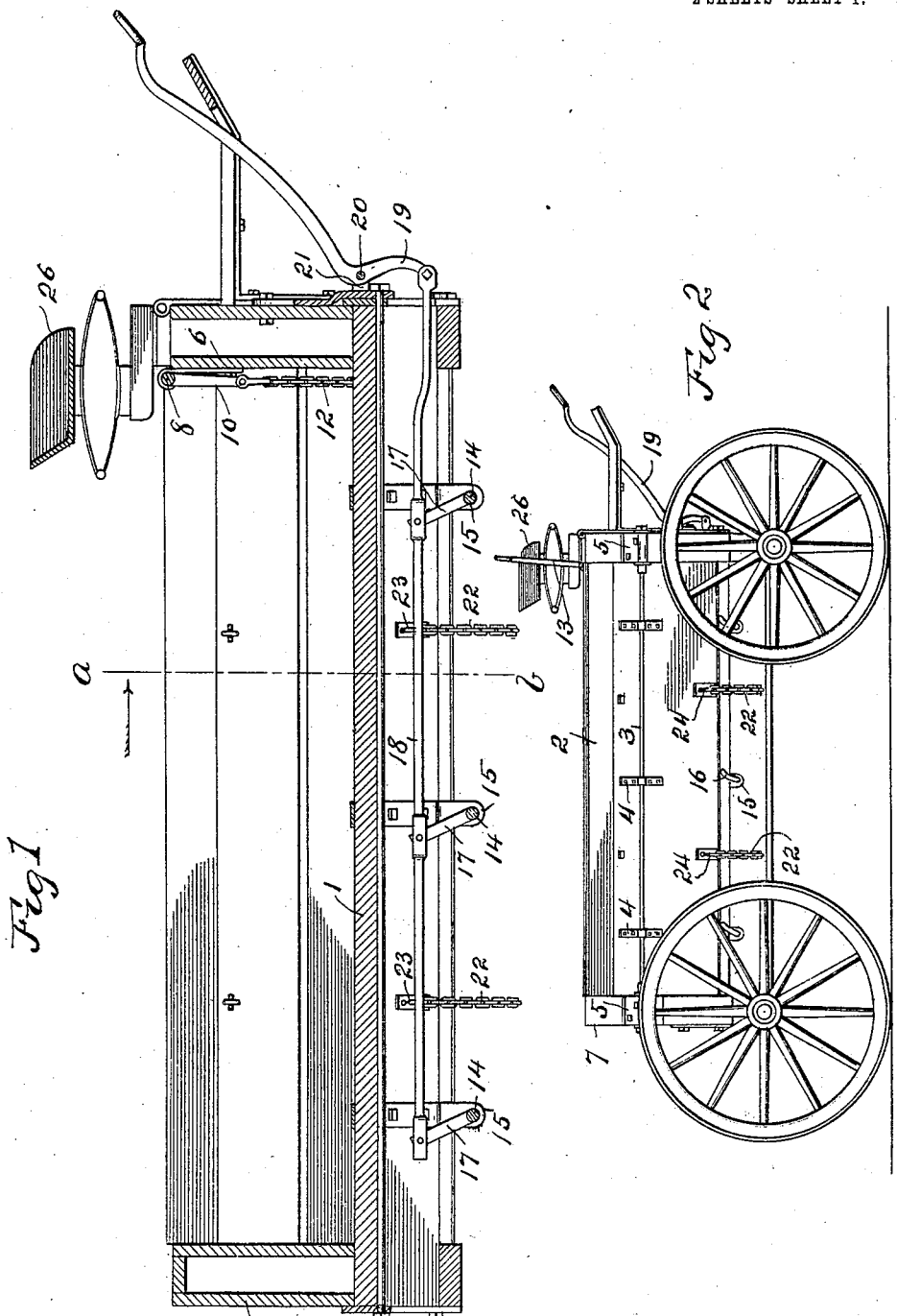

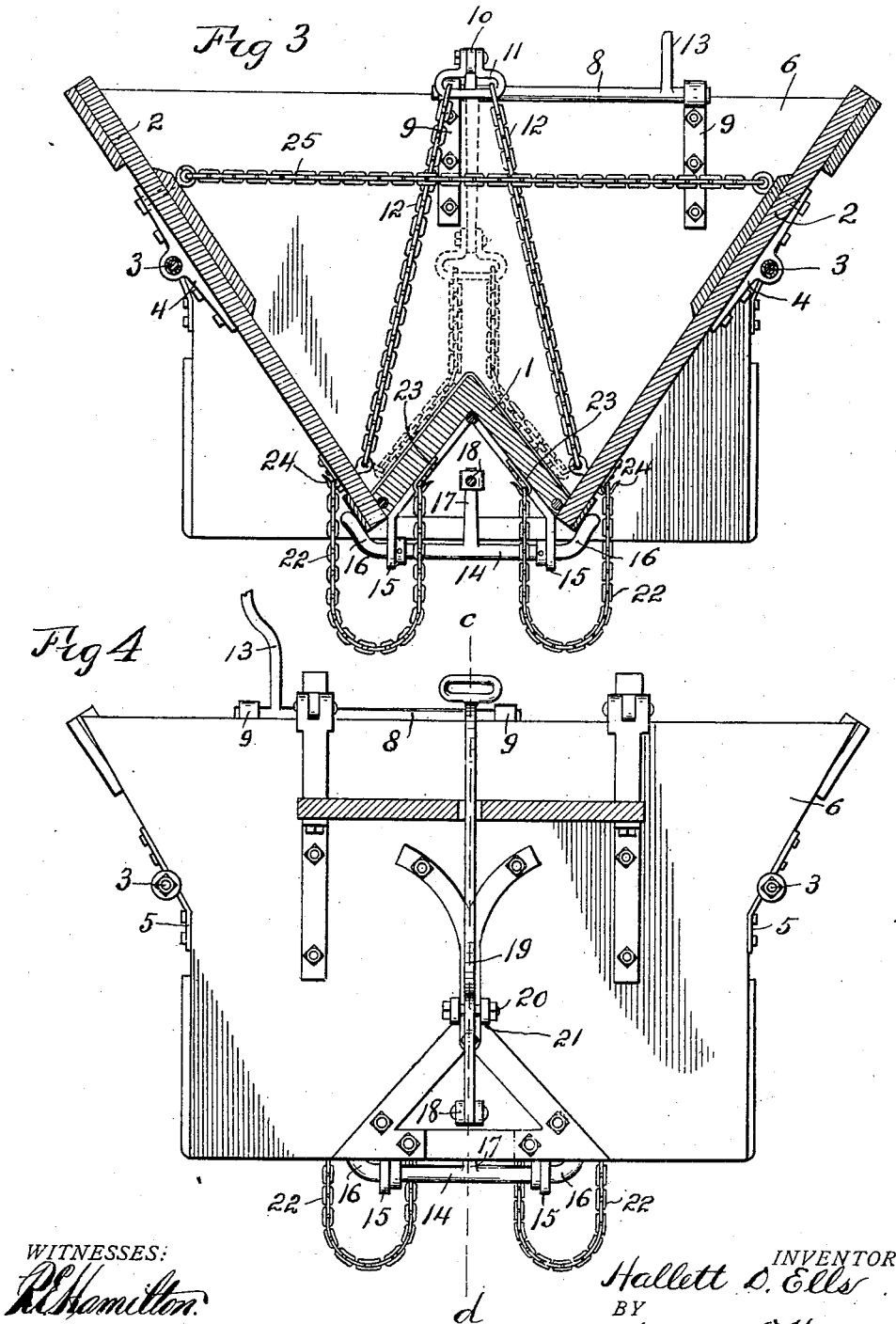

HALLETT D. ELLS, OF KANSAS CITY, MISSOURI, ASSIGNOR OF ONE-FOURTH TO HENRY M. GODARD, OF KANSAS CITY, MISSOURI.

DUMPING-WAGON.

969,258.     Specification of Letters Patent.     Patented Sept. 6, 1910.

Application filed June 19, 1909. Serial No. 503,190.

*To all whom it may concern:*

Be it known that I, HALLETT D. ELLS, a citizen of Canada, residing at Kansas City, in the county of Jackson and State of Missouri, have invented a certain new and useful Improvement in Dumping-Wagons, of which the following is a specification.

My invention relates to improvements in dumping wagons.

The object of my invention is to provide a dumping wagon which is simple and strong in construction, which will securely hold the load, and which may be readily operated to discharge the load and to be placed in condition to receive the load.

My invention is an improvement on the one described and claimed in an application filed by me Dec. 31, 1908, and having Serial No. 470,184.

The novel features of my invention are hereinafter described and claimed.

In the accompanying drawings illustrative of my invention—Figure 1 is a longitudinal, central, vertical sectional view, on the dotted line $c-d$ of Fig. 4. Fig. 2 is a side elevation on a reduced scale. Fig. 3 is a vertical section on the dotted line $a-b$ of Fig. 1. Fig. 4 is an end view, partly in elevation and partly in vertical section.

Similar characters of reference denote similar parts.

In the preferred form of my invention, the wagon bed is provided with an angular bottom 1, which inclines downwardly and outwardly from its longitudinal center. The bed is provided with sides 2, which swing laterally toward and from the bottom 1. Said sides are mounted on horizontal parallel pivots, comprising preferably two longitudinal, horizontal bars 3, which have mounted upon them pivotally, bearings 4, secured to the outer side of the sides 2. The pivot bars 3 are each mounted at its ends in bearings 5, mounted respectively on the forward end 6 and rear end 7 of the wagon bed.

For swinging the sides 2 to the closed position shown in Fig. 3, I preferably employ the following described mechanism:— A horizontal rock shaft 8, is pivotally mounted in bearings 9, secured to the forward end 6 of the bed. The rock shaft is provided with a crank arm 10, to which is pivoted a clevis 11, which has secured to it the upper ends of two chains 12, the lower ends of which are respectively secured to the sides 2 below the pivot bars 3. The shaft 8 is provided with a crank 13, by which it may be rocked so as to swing the sides 2 to the closed position.

The following described mechanism is the preferred mechanism for releasably and reliably holding the sides 2 in the closed position:—A plurality of horizontal rock members 14 are disposed transversely under the bottom 1, from which they are pivotally supported by means of depending plates 15, which are secured to the under side of the bottom 1. Each member 14 is provided at its ends with laterally turned arms 16, adapted to respectively embrace the outer sides of the swinging sides 2 so as to hold them in the closed position. Each rock member 14 is provided with a crank arm 17, which is pivotally connected to a horizontal, longitudinal bar 18, the forward end of which is pivoted to the lower end of an operating lever 19, which is pivotally mounted on a horizontal bolt 20, mounted in a bracket 21, which is secured to the forward side of the forward end 6 of the bed. By swinging the lever 19 forward and backward, the rock members 14 are alternately swung into and out of engagement with the sides 2.

For adjustably limiting the outward swinging of the lower edges of the sides 2 I preferably employ two chains 22, one set of ends of which is secured to two hooks 23, which are secured to the bottom 1. The other set of ends is detachably secured to two hooks 24, which are secured upon the outer sides of the swinging sides 2. By shifting the chains 22 so that different links may be engaged with the hooks 24, the outward swinging of the sides 2 may be adjustably limited.

To assist in supporting the load, I preferably employ a chain 25, the ends of which are respectively secured to the swinging sides 2 at points above the pivot bars 3. When the sides 2 are in the closed position shown in Fig. 3, the chain 25 is drawn taut, and thus prevents the load from bending outward, by its pressure, the pivot bars 3.

In dumping a load, the operator, who sits upon a seat 26, supported on the front end 6 of the wagon, forces rearwardly the upper end of the lever 19, thereby forcing the bar 18 forward and rocking the rock members 14 out of engagement with the sides 2, which will then swing outwardly at their lower ends, thus permitting the load to be discharged. After the load has been discharged the operator swings the rock shaft 8 by means of the crank 13, and thus raises the crank arm 10, which by means of the clevis 11 and chains 12 draws the swinging sides 2 to the closed position. The operator then forces forward the upper end of the lever 19, thereby reëngaging the arms 16 of the rock members 14 with the swinging sides 2, through the intermediacy of the bar 18 and crank arms 17.

Various modifications of my invention, within the scope of the appended claims, may be made without departing from its spirit.

Having thus described my invention, what I claim and desire to secure by Letters Patent is:—

1. In a dumping wagon, the combination with a wagon bed having two swinging sides mounted respectively on horizontal parallel pivots, said sides swinging outwardly at their lower edges to the open position, means for engaging said sides adjacent to their lower edges for holding the sides in the closed position, and a flexible device having its ends secured respectively to said sides at points above their pivots, said flexible device being drawn taut when the sides are in a closed position.

2. In a dumping wagon, the combination with a wagon bed having two swinging sides mounted respectively on horizontal parallel pivots, the sides swinging outwardly at their lower edges to the open position, means for releasably engaging said sides adjacent to their lower edges for holding them in the closed position, and a chain having its ends secured respectively to said sides above their pivotal points, said chain being drawn taut and supporting said sides in the closed position.

3. In a dumping wagon, the combination with a wagon bed having two swinging sides mounted on horizontal parallel pivots, of a rock shaft having a crank arm, two chains having one set of ends respectively secured to said crank arm, the other set of ends being secured respectively to said sides below the pivotal points thereof for swinging the sides to the closed position when the shaft is rocked in the proper direction, and a chain having its ends respectively secured to said sides above their pivotal points, said chain being drawn taut and supporting the sides in the closed position.

4. In a dumping wagon, the combination with a wagon bed having two swinging sides mounted on horizontal parallel pivots, of a rock shaft having a crank arm, two chains secured to said crank arm and to said sides below their pivots for swinging the sides to the closed position, a chain having its ends secured to said sides above their pivots, said chain being drawn taut and supporting the sides in the closed position, and releasable means for locking the sides in the closed positions.

In testimony whereof I have signed my name to this specification in presence of two subscribing witnesses.

HALLETT D. ELLS.

Witnesses:
 E. B. HOUSE,
 R. E. HAMILTON.